(12) United States Patent
Knipe et al.

(10) Patent No.: US 8,736,404 B2
(45) Date of Patent: May 27, 2014

(54) MICROMECHANICAL DIGITAL CAPACITOR WITH IMPROVED RF HOT SWITCHING PERFORMANCE AND RELIABILITY

(75) Inventors: Richard L. Knipe, McKinney, TX (US); Robertus Petrus Van Kampen, 's-Hertogenbosch (NL); Anartz Unamuno, Roermond (NL)

(73) Assignee: Cavendish Kinetics Inc., San Jose, CA (US)

( * ) Notice: Subject to any disclaimer, the term of this patent is extended or adjusted under 35 U.S.C. 154(b) by 231 days.

(21) Appl. No.: 12/896,198

(22) Filed: Oct. 1, 2010

(65) Prior Publication Data
US 2011/0079495 A1   Apr. 7, 2011

Related U.S. Application Data

(60) Provisional application No. 61/247,852, filed on Oct. 1, 2009.

(51) Int. Cl.
*H01H 51/22*   (2006.01)
*H01H 57/00*   (2006.01)

(52) U.S. Cl.
USPC ............................................. 335/78; 200/181

(58) Field of Classification Search
USPC .................................. 335/4, 78–86; 200/181
See application file for complete search history.

(56) References Cited

U.S. PATENT DOCUMENTS

| | | | |
|---|---|---|---|
| 4,502,225 A | 3/1985 | Lin | |
| 5,475,353 A * | 12/1995 | Roshen et al. | 335/78 |
| 5,677,823 A * | 10/1997 | Smith | 361/234 |
| 6,287,385 B1 | 9/2001 | Kroneberger | |
| 6,376,787 B1 * | 4/2002 | Martin et al. | 200/181 |
| 6,803,534 B1 * | 10/2004 | Chen et al. | 200/181 |
| 7,293,995 B2 | 11/2007 | Li | |
| 7,342,473 B2 * | 3/2008 | Joung et al. | 335/78 |
| 7,527,502 B2 | 5/2009 | Li | |
| 7,546,677 B2 * | 6/2009 | Lee et al. | 29/622 |
| 8,008,835 B2 * | 8/2011 | Degertekin | 310/309 |
| 8,138,655 B2 * | 3/2012 | Ikehashi et al. | 310/309 |
| 2002/0005341 A1 | 1/2002 | Seki | |
| 2003/0006858 A1 | 1/2003 | Ma | |
| 2003/0148550 A1 * | 8/2003 | Volant et al. | 438/52 |
| 2005/0017313 A1 * | 1/2005 | Wan | 257/415 |
| 2010/0116632 A1 * | 5/2010 | Smith et al. | 200/181 |
| 2010/0181631 A1 * | 7/2010 | Lacey | 257/415 |
| 2011/0259717 A1 * | 10/2011 | Pillans et al. | 200/181 |

FOREIGN PATENT DOCUMENTS

DE   19736674 C1   11/1998

OTHER PUBLICATIONS

International search report and written opinion for PCT/US2010/051121 (CK064PCT) dated Feb. 15, 2012.
Office Action for European Patent Application No. 10771237.4-1508 (CK064EP) dated Feb. 27, 2013.

* cited by examiner

*Primary Examiner* — Mohamad Musleh
(74) *Attorney, Agent, or Firm* — Patterson & Sheridan, LLP

(57) ABSTRACT

The present invention generally relates to RF MEMS devices that are capable of hot switching. The RF MEMS devices, by utilizing one or more spring mechanisms, are capable of hot switching. In certain embodiments, two or more sets of springs may be used that become engaged at specific points in the displacement of the cantilever of the MEMS device. The springs allow for a significant increase in the release voltage for a given pull in landing voltage.

7 Claims, 17 Drawing Sheets

MICROMECHANICAL DIGITAL CAPACITOR WITH IMPROVED RF HOT SWITCHING PERFORMANCE AND RELIABILITY

CROSS-REFERENCE TO RELATED APPLICATIONS

This application claims benefit of U.S. Provisional Patent Application Ser. No. 61/247,852 (CK064L), filed Oct. 1, 2009, which is herein incorporated by reference.

BACKGROUND OF THE INVENTION

1. Field of the Invention

Embodiments of the present invention generally relate to the field of micromechanical variable capacitors, specifically to the act of releasing a digital capacitor in the presence of a residual RF voltage. The inventions described herein can be applied to any micromechanical structure where the difference between latching voltage and actuation voltage needs to be minimized. It allows devices to be made where the spring constant of the cantilever can be engineered to be greater than the electrostatic attraction across the landing contact due to the voltage dropped across the capacitance contact, while the voltage required to turn the device on is unchanged.

2. Description of the Related Art

Micromechanical actuators are based on the simple principal that they will deflect or move in the presence of an external force. The deflection of these actuators typically follows a linear relationship between force and deflection. The slope of this relationship is defined by the materials used, the geometries of the switch and/or legs, and how the switch and/or legs are anchored (Hooke's Law in the general sense).

$$\text{Spring Force} = F\text{spring} = K \ast X \quad (1)$$

Where K is the spring constant and X is the displacement.

The external force normally does not follow a linear relationship between its magnitude and the position of the switch. For the case of electrostatics, the force will increase with the square of the position to the control electrode. This situation causes the phenomena of "snap-in" when a critical displacement is reached. The Electrostatic Force $F_E$ is given by:

$$F_E = \frac{\varepsilon_0 A}{2(Z-X)^2} V^2 \quad (2)$$

Where A is the area of overlap between the pull down electrode and the micro electromechanical system (MEMS) device, Z is the starting position, $\varepsilon_o$ is the permittivity of free space and V is the applied control voltage. Equilibrium is defined when the sum of all forces is zero which yields the classic snap-in behavior for electrostatic MEMS. Once the cantilever jumps to contact the separation between the cantilever and the pull in electrode is greatly reduced and from equation 2 the electrostatic force increases greatly. To allow the cantilever to pull off the control voltage has to be reduced greatly.

FIG. 1A shows the forces acting on the MEMS device vs. the displacement for an electrostatically actuated MEMS device with a linear spring. Note that the vertical scale of the figure has a logarithmic scale, to better show the various points on the graph. The curve labeled Fspring shows the mechanical force vs. the displacement of the spring which varies linearly with displacement. The curves labeled F@V1, F@V2, F@V3 are the electrostatic forces acting on the MEMS device for different applied voltages V1, V2, V3 where V3>V2>V1.

The MEMS displacement at various applied voltages is found by finding the intersection of the mechanical force curve and the electrostatic force curves. For instance when voltage V1 is applied, the MEMS device displaces to point p1. When the applied voltage is increased to V2 the MEMS device displaces to point p2 and when the voltage is increased to V3 the MEMS device displaces to point p3. At this point when the voltage is increased any further there is no longer an intersection of the electrostatic force curve with the mechanical force curve, because the electrostatic force is always larger than the mechanical force. As a result, the device snaps in and displaces to point p4.

When the voltage is subsequently reduced from V3 to V2 the electrostatic force F@V2 at the displaced location p4 is still larger than the mechanical force Fspring so that the device stays displaced at point p4. Once the voltage is reduced to V1 the electrostatic force F@V1 at the displaced location p4 is as large as mechanical force Fspring. Any further reduction of the voltage would result in only one intersection with the mechanical force curve in point p1 and the device will snap back from point p4 to point p1.

FIG. 1B shows the MEMS displacement vs. applied voltage for the MEMS devices with a linear spring. Shown in this figure are the same points as shown in FIG. 1A. During the up-sweep of the applied voltage, the displacement follows the curve labeled pull-in. At an applied voltage of 5V, the MEMS devices displaces to point p1. Then as the voltage is increased to 15V, the device displaces to point p2. When the voltage is increased to 25V, the MEMS device displaces to point p3. Any further increase in voltage would result in the device to snap in to the full displacement and end up in point p4. Then the voltage is reduced and the displacement follows the curve labeled release. When the voltage is reduced to 5V, the displacement stays at 100% of the gap (point p4'). Any further reduction makes the device snap back down to point p1. Thus, the pull-in voltage is 25V and the release voltage is 5V. FIG. 1B shows the large difference between the release voltage (voltage at which the device snaps from position p4' to position p1) and landing voltage (voltage at which the device snaps from position p3 to position p4).

The large difference between the release voltage and the landing voltage creates a problem for capacitive RF MEMS when it comes to hot switching. Hot switching is defined as the largest RF voltage that can exist between, for example a MEMS cantilever switch and a landing electrode for which the spring constant of the cantilever is able to pull the contact apart when the control voltage is set to zero.

Therefore, there is a need for RF MEMS that are capable of hot switching.

SUMMARY OF THE INVENTION

The present invention generally relates to RF MEMS devices that are capable of hot switching. The RF MEMS devices, by utilizing one or more spring mechanisms, are capable of hot switching. In certain embodiments, two or more sets of springs may be used that become engaged at specific points in the displacement of the cantilever of the MEMS device. The springs allow for a significant increase in the release voltage for a given landing voltage.

In one embodiment, a MEMS device is disclosed. The device includes a substrate, a first support post coupled to the substrate and extending vertically therefrom and a first cantilever coupled to the first support post. The device also includes a second support post coupled to the substrate at a location spaced from the first support post. The second support post extends vertically from the substrate. The device also includes a second cantilever coupled to the second support post, a pull-in electrode coupled to the substrate in a location between the first support post and the second support post and a contact electrode coupled to the substrate in a location between the pull-in electrode and the second support post.

In another embodiment, a method of operating a MEMS device is disclosed. The method includes applying a voltage to a pull-in electrode. The method also includes moving a first cantilever a first distance and into contact with a second cantilever while the voltage is applied. The method also includes moving the first cantilever and the second cantilever a second distance such that the first cantilever contacts a contact electrode and the second cantilever is spaced from the contact electrode while the voltage is applied. The method also includes changing the voltage applied to the pull-in electrode and spacing the first cantilever from the contact electrode.

In another embodiment, a MEMS device is disclosed. The MEMS device includes a substrate, a support post coupled to the substrate and extending vertically therefrom and a cantilever coupled to the support post, the cantilever having a first portion and a second portion extending from the first portion. The MEMS device also includes a contact post coupled to the substrate at a location spaced from the first support post. The contact post extends vertically from the substrate. The MEMS device also includes a pull-in electrode coupled to the substrate in a location between the support post and the contact post. The MEMS device also includes a contact electrode coupled to the substrate in a location between the pull-in electrode and the contact post. The first portion is movable from a position spaced from the contact electrode to a position in contact with the contact electrode and the second portion is movable from a position spaced from the contact post to a location in contact with the contact post.

In another embodiment, a method of operating a MEMS device is disclosed. The method includes applying a voltage to a pull-in electrode. The method also includes moving a cantilever a first distance such that a first portion of the cantilever is spaced from a contact electrode and a second portion of the cantilever is in contact with a contact post while the voltage is applied. The method also includes moving the cantilever a second distance such that the first portion contacts the contact electrode while the second portion remains in contact with the contact post while the voltage is applied. The method also includes changing the voltage applied to the pull-in electrode and spacing the cantilever from the contact electrode and the contact post.

In another embodiment, a device includes a substrate having one or more electrodes formed therein, an electrically insulating layer disposed over the substrate and the one or more landing structures coupled to the electrically insulating layer. The micro electromechanical device also includes a MEMS element coupled to the electrically insulating layer. The MEMS element is movable from a first position to a second position spaced from the electrically insulating layer. The MEMS element includes a first portion that contacts the electrically insulating layer when the MEMS element is in the first position and a second portion that contacts the one or more landing structures when the MEMS element is in the second position.

In another embodiment, a device includes a substrate having one or more electrodes formed therein, an electrically insulating layer disposed over the substrate and the one or more electrodes, and one or more spring elements coupled to the electrically insulating layer, the one or more spring elements movable from a first position to a second position. The device also includes a MEMS element coupled to the electrically insulating layer. The MEMS element is movable from a third position to a fourth position spaced from the electrically insulating layer. The MEMS element includes a first portion that contacts the electrically insulating layer when in the third position and a second portion that contacts the one or more spring elements and moves the one or more spring elements from the first position to the second position.

In another embodiment, a method includes forming a MEMS element over a substrate having an insulating layer, one or more landing structures, and a first sacrificial layer disposed thereover. The forming a MEMS element includes forming a first structural layer over the first sacrificial layer, forming a second sacrificial layer over the first structural layer, removing at least one portion of the second sacrificial layer to expose a portion of the first structural layer, forming a structural element over the exposed first structural layer, and forming a second structural layer over the second sacrificial layer and the structural element. The method also includes removing the first sacrificial layer and the second sacrificial layer to free the MEMS element. The freed MEMS element is movable from a first position to a second position. The freed MEMS element has a first portion that contacts the insulating layer when the MEMS element is in the first position. The freed MEMS element also includes a second portion that contacts the one or more landing structures when the MEMS element is in the second position.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention uses two or more sets of springs that become engaged at specific points in the displacement. This allows for a significant increase in the voltage that can be applied to the RF electrode for a given pull in landing voltage.

Figure 2A:
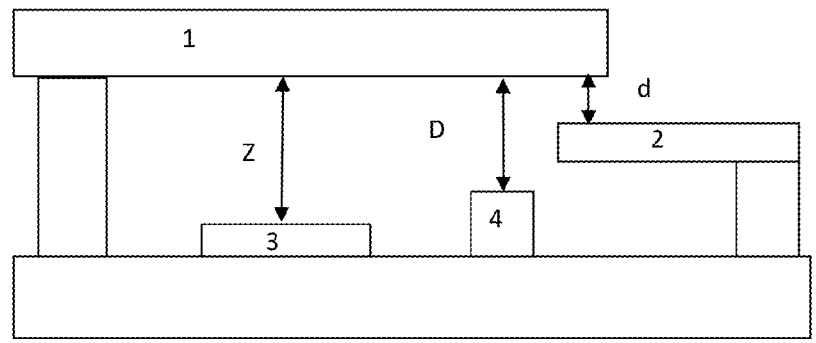
FIGS. 2A-2C are schematic representations of a MEMS device according to one embodiment.

If the cantilever initially has a spring constant of k1 and then after it has been pulled in a distance d it lands on an additional spring with a spring constant k2, then the spring constant of the combined system has a step wise increase. The second spring 2 can either be on the substrate or it can be attached to the first cantilever (as shown in FIG. 2A and FIG. 2D respectively) and make contact to a bump before the first cantilever makes contact to the substrate or contact. Thus there are two regions of displacement X for the end of the first primary cantilever, firstly from 0 to d where the restoring force is k1*X and then from d to D the restoring force is (k1*X+k2*(X−d)). Here, D is the total movement of the first cantilever until it makes contact with the substrate contact (we assume D is greater than d).

For FIG. 2A, X<d: F=k1*X. For FIG. 2C, X>d: F=(k1*X+k2*(X−d)). For FIG. 2D, X<d: F=k1*X. For FIG. 2E, X>d: F=(k1*X+k2*(X−d)). The mechanical restoring force then follows the curve shown in FIG. 3.

Figure 3:
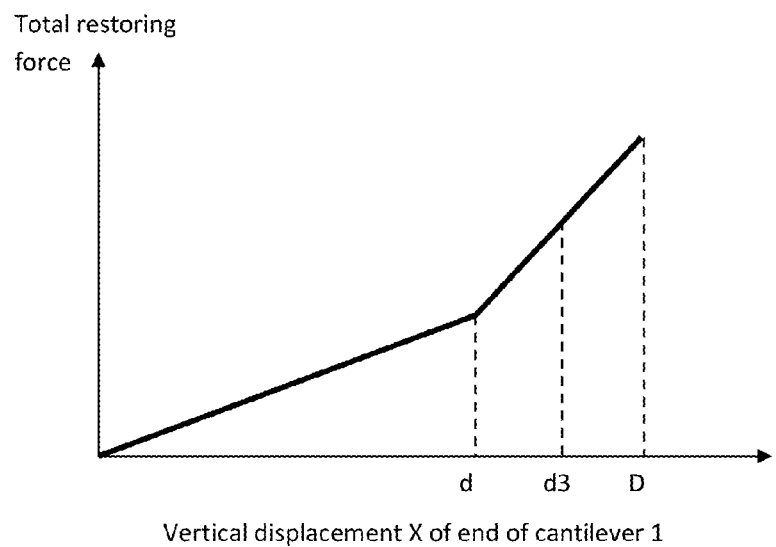
FIG. 3 shows the total restoring force versus displacement for a compound system containing two cantilevers.

This process could be continued with more than one extra cantilever which would give a number of increasing slopes to the curve shown in FIG. 3 with the third cantilever landing at d3 where d3 lies between d and D.

The electrostatic pull in force is given by:

$$\text{Electrostatic Force} = F_E = \frac{\varepsilon_0 A_3}{2(Z-X)^2} V^2 \qquad (3)$$

For a plate of area $A_3$ moving to a pull in plate (3 in FIGS. 2A-2E) of the same area when they are separated by a gap (Z−X). For a cantilever, there is a slope change and so there is a modification to these formulae, but the essential feature that the electrostatic force increases as one over the gap squared remains. This means that there is a large attractive force when the cantilever is close to the pull in electrode (3 in FIGS. 2A-2E).

If we are trying to hot switch a cantilever, then there will also be a voltage difference between cantilever 1 and the landing bump 4. This puts an additional attraction which also follows the formula (4), though with Z replaced with D and the new area $A_4$ being the overlap of the contact 4 with the cantilever 1.

$$\text{Electrostatic Force} = F_E = \frac{\varepsilon_0 A_4}{2(D-X)^2} V^2 \qquad (4)$$

For a capacitance switch there would be a thin insulator over contact 4 of thickness z. This would limit the electrostatic pull in force from the contact to a maximum:

$$\text{Electrostatic Force} = F_E = \frac{\varepsilon_0 A_4}{2z^2} V^2 \qquad (5)$$

The second cantilever can be designed so that the spacing and spring force are such that the voltage required to pull the cantilever 1 down to touch the contact 4 is unchanged, but the pull off force at contact 4 is large enough to overcome the electrostatic attraction due to the voltage drop across the dielectric at that contact due to the voltage $V_4$ at contact 4.

Figure 1A:
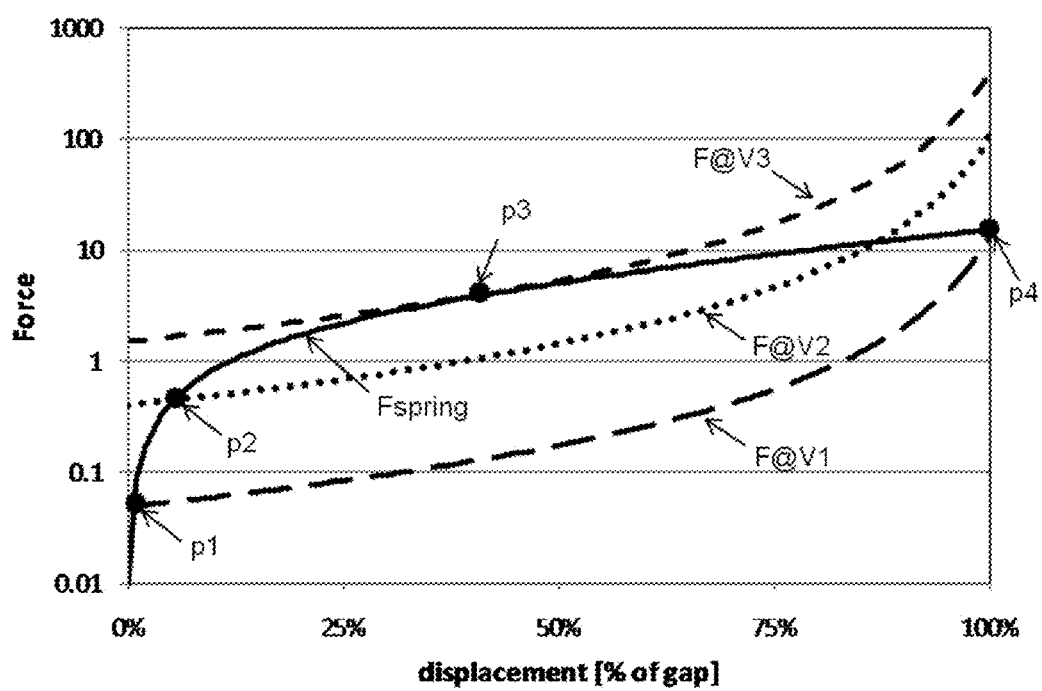
FIG. 1A shows the force vs. displacement for an electrostatically actuated MEMS device with a linear spring.
Figure 4A:
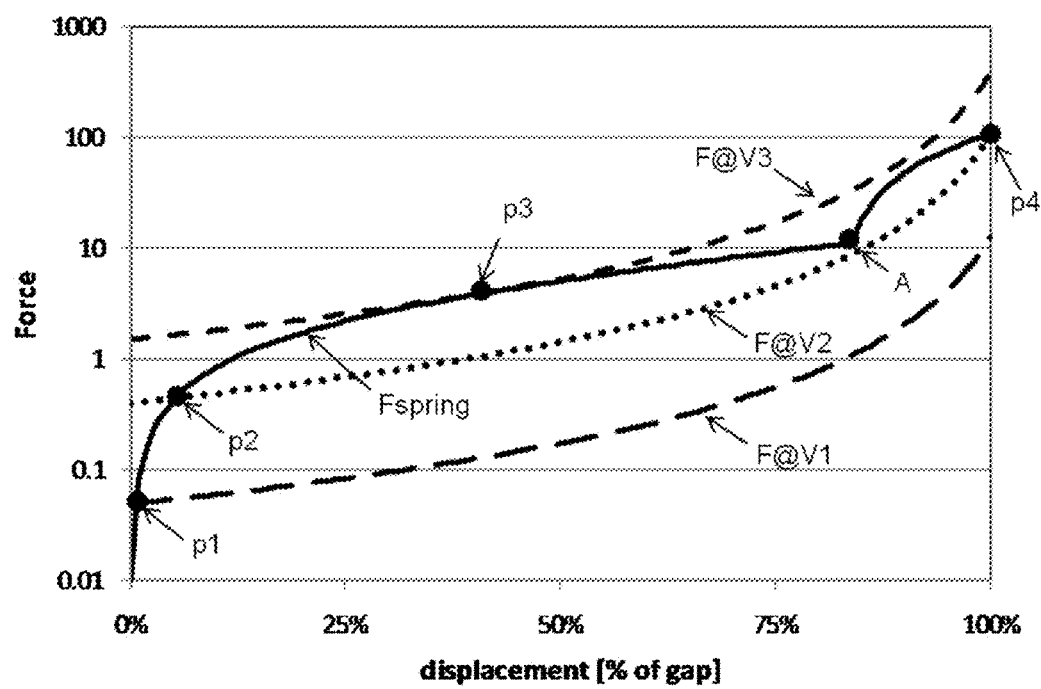
FIG. 4A shows the force vs. displacement for an electrostatically actuated MEMS device with a compound spring.

To illustrate this further, inspect FIG. 4A which shows a force vs. displacement curve for a MEMS system including a compound spring. Note that the vertical scale of the figure has a logarithmic scale, to better show the various points on the graph. The mechanical spring force is indicated by the curve labeled Fspring. The initial part of this curve follows the linear spring curve shown in FIG. 1A. Then at the point marked A the compound spring is engaged and there is an increase in the spring constant indicated by a steeper slope of the force-vs.-displacement curve. The curves labeled F@V1, F@V2, F@V3 are the electrostatic forces acting on the MEMS device for different applied voltages V1, V2, V3 where V3>V2>V1. The MEMS displacement at various applied voltages is found by finding the intersection of the mechanical force curve and the electrostatic force curves.

For instance when voltage V1 is applied, the MEMS device displaces to point p1. When the applied voltage is increased to V2 the MEMS device displaces to point p2 and when the voltage is increased to V3 the MEMS device displaces to point p3. At this point when the voltage is increased any further there is no longer an intersection of the electrostatic force curve with the mechanical force curve, because the electrostatic force is always larger than the mechanical force. As a result, the device snaps in and displaces to point p4.

When the voltage is subsequently reduced from V3 to V2 the electrostatic force F@V2 at the displaced location p4 is as large as mechanical force Fspring. Any further reduction of the voltage would result in only one intersection with the mechanical force curve in point p1 and the device will snap back from point p4 to point p2.

From the above analysis one can summarize that the pull-in voltage of the device with a compound spring is V3 and the release voltage is V2.

Figure 4B:
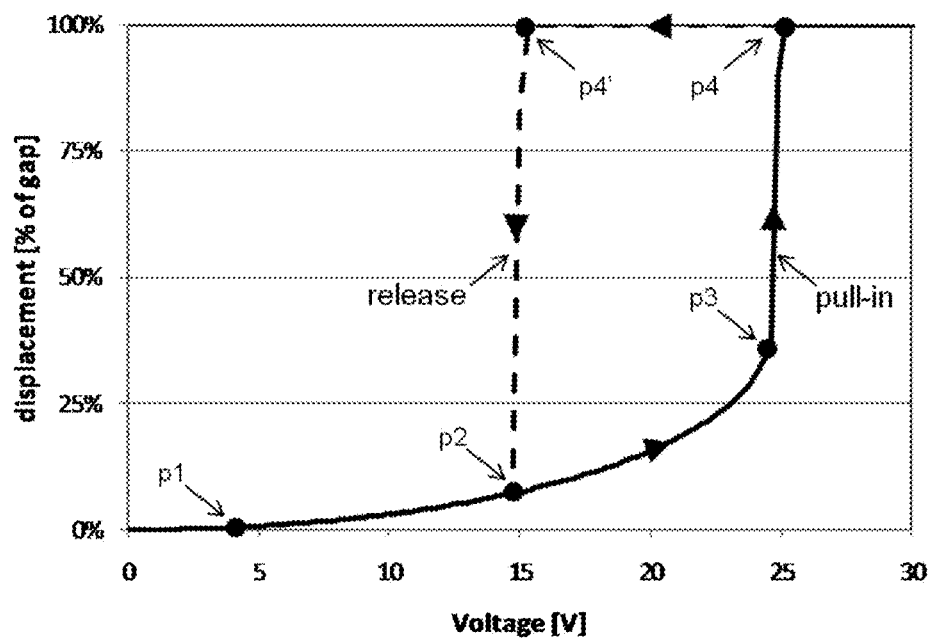
FIG. 4B shows the pull-in and release voltages of an electrostatically actuated MEMS device with a compound spring.

FIG. 4B shows the MEMS displacement vs. applied voltage for the MEMS device with the compound spring. Shown in this figure are the same points as shown in FIG. 4A. During the up-sweep of the applied voltage the displacement follows the curve labeled pull-in. At an applied voltage of 5V, the MEMS device displaces to point p1. Then as the voltage is increased to 15V, the device displaces to point p2. When the voltage is increased to 25V, the MEMS device displaces to point p3. Any further increase in voltage would result in the device to snap in to the full displacement and end up in point p4. Then the voltage is reduced and the displacement follows the curve labeled release. When the voltage is reduced to 15V the displacement stays at 100% of the gap (point p4'). Any further reduction makes the device snap back down to point p2. Thus, the pull-in voltage is 25V and the release voltage is 15V. From this analysis the advantage of the compound spring is clear. There is an increase in the release voltage from 5V to 15V, while the pull-in voltage has not changed.

Figure 5:
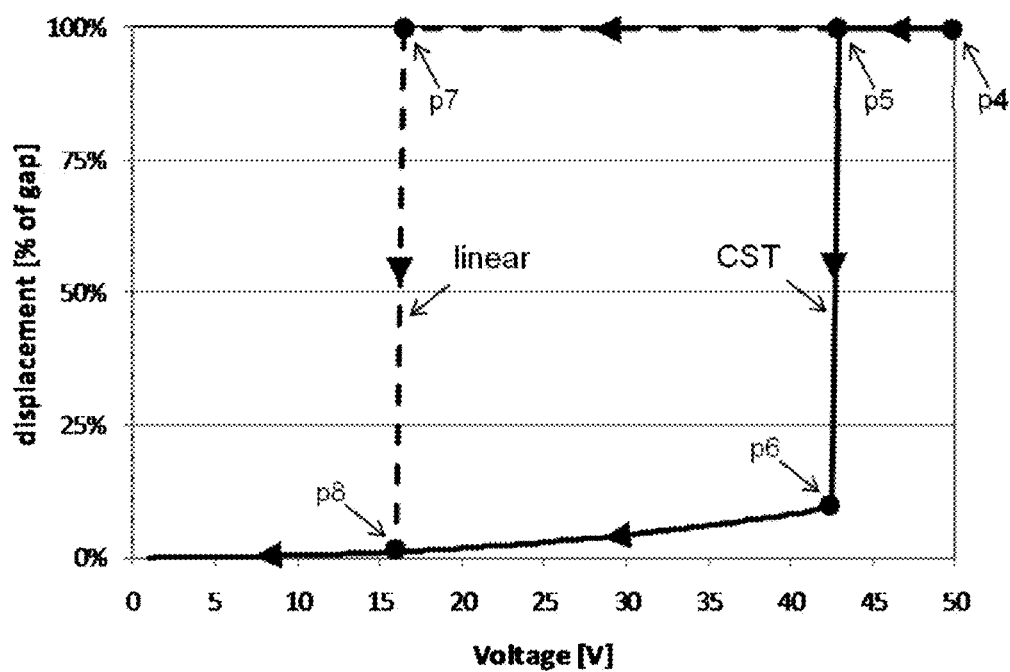
FIG. 5 shows the hot-switch comparison between a MEMS RF device with a linear spring and with a compound spring.

FIG. 5 shows the hot-switch comparison between a MEMS RF device with a linear spring (curve labeled linear) and with a compound spring (curve labeled CST). The hot-switch voltage is defined as the maximum voltage that is allowed on the RF electrode while the device still can be released when the voltage on the pull-in electrodes is removed.

Figure 1B:
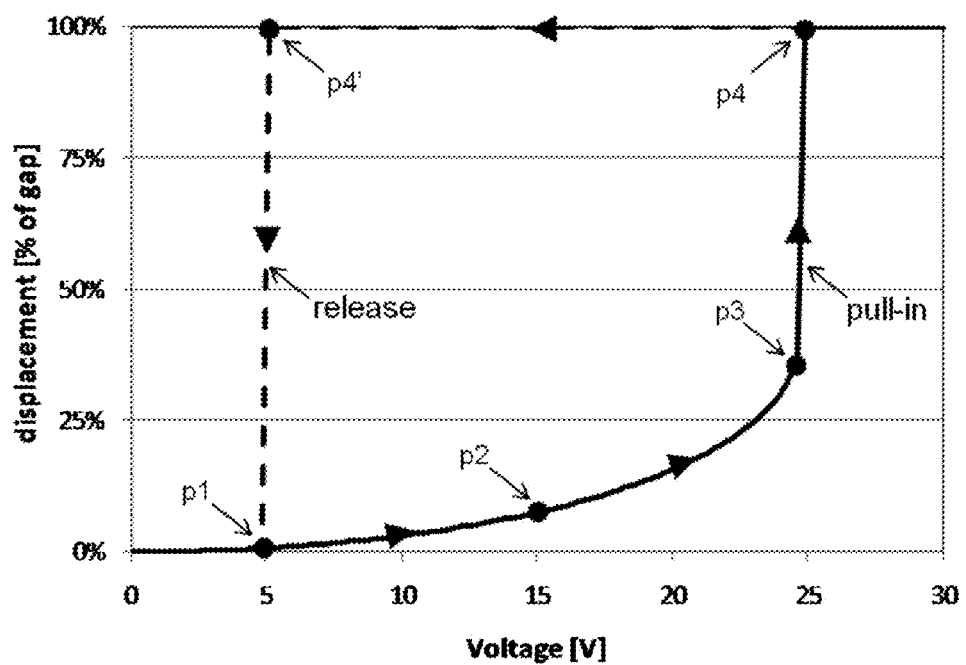
FIG. 1B shows the pull-in and release voltages of an electrostatically actuated MEMS device with a linear spring.

The MEMS device was first pulled in using a large enough voltage on the pull-in electrodes, i.e. the displacement would follow the curves labeled pull-in in FIGS. 1B (linear spring) and 4B (compound spring) and result in the MEMS device to be displaced to point p4. Subsequently the voltage on the RF-electrode was increased to 50V and the voltage on the pull-in electrodes was removed. This voltage applied on the RF electrode is large enough to keep the MEMS device displaced in point p4 even though the pull-in voltage was removed.

Subsequently, the voltage on the RF electrode was slowly reduced until the device snaps-back to find the maximum voltage on the RF that can hold the device in a displaced position (the hot-switch voltage). For the device with the compound springs, the voltage has to be reduced to 43V until the device releases and moves from point p5 to p6. For the device with the linear springs, the voltage has to be reduced to 15V until the device releases and moves from point p7 to p8.

From the above analysis one can summarize that the device with the compound springs can thus handle a much larger voltage on the RF electrode and still be able to release when the voltage on the pull-in electrodes is removed.

Figure 6A:
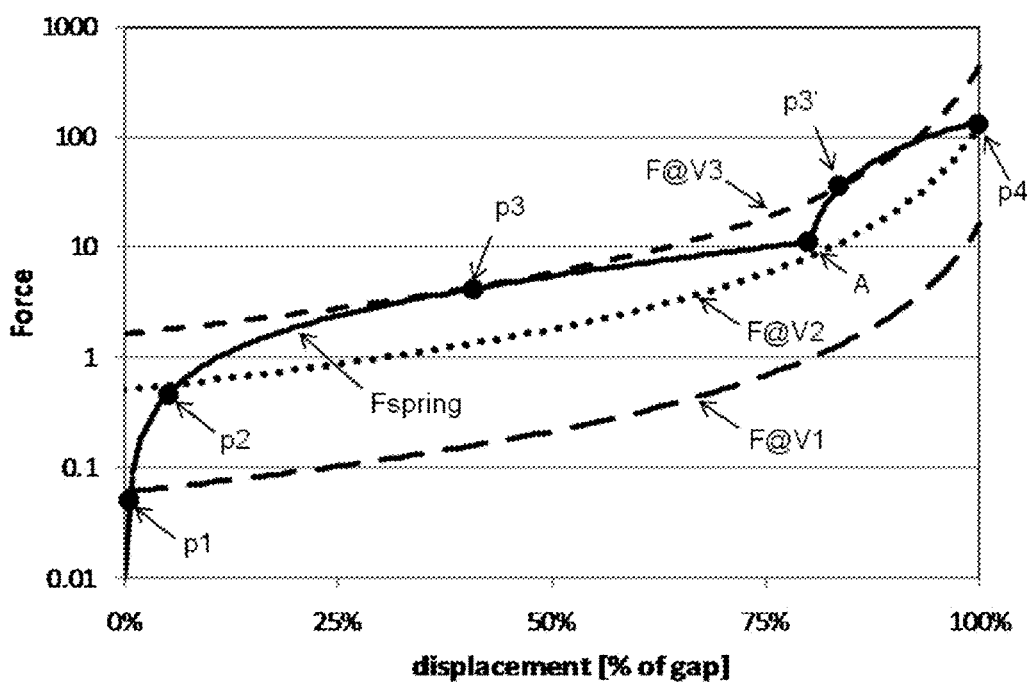
FIG. 6A shows the force vs. displacement for an electrostatically actuated MEMS device with a compound spring with a modified parameter set.
Figure 6B:
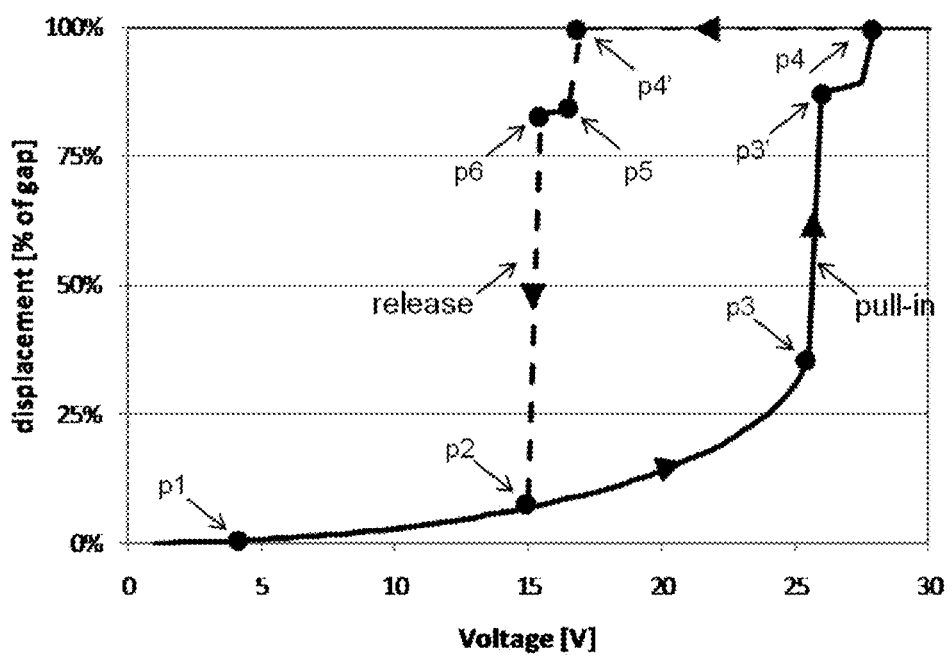
FIG. 6B shows the pull-in and release voltages of an electrostatically actuated MEMS device with a compound spring with a modified parameter set.

By adjusting Z, D, d, k1 and k2, it is possible to obtain the situation where there is an initial pull-in of the cantilever to d, but the electrostatic force is not high enough yet to completely pull-in the cantilever to D. This is illustrated in FIGS. 6A and 6B. The initial pull-in of the device happens when the MEMS displacement snaps from point p3 to p3'. At that point the non-linear spring is too stiff to allow a full pull-in of the device. A little more voltage on the control electrode is required to overcome the non-linear spring and pull the device in to point p4. Upon reduction of the control voltage, the MEMS displacement can also show 2 release points, first going from point p4' to point p5 dominated by the high spring-constant section of the compound spring and a subsequent snap-back from point p6 to p2 dominated by the low spring-constant section of the compound spring.

Figure 7:
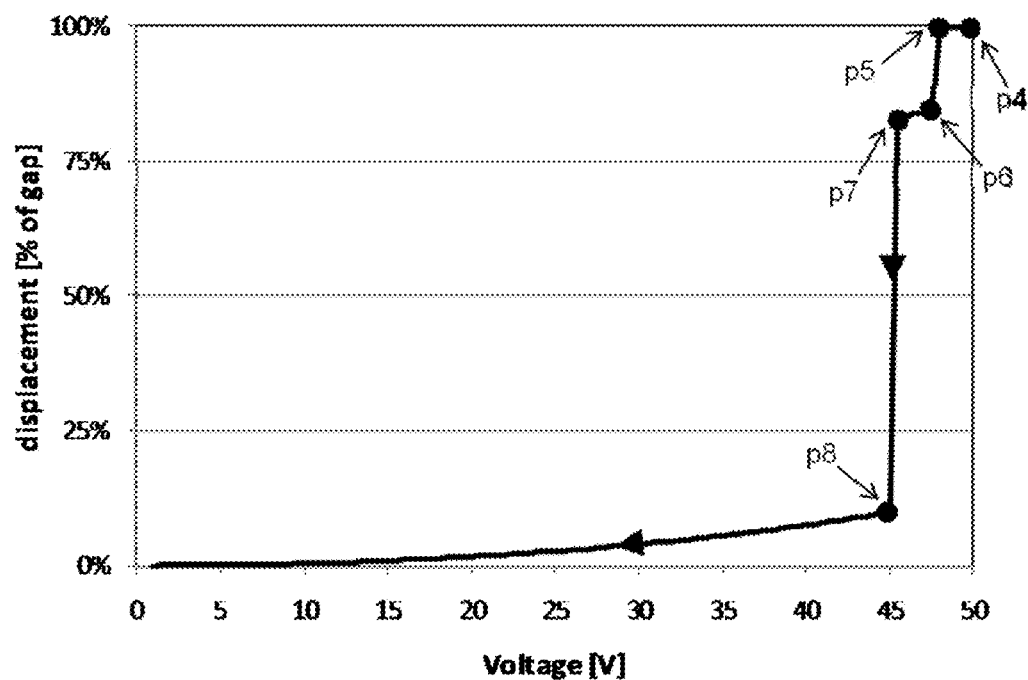
FIG. 7 shows the hot-switch performance between of a MEMS RF device with a compound spring using a modified parameter set.

The resulting hot-switch curve of this device is shown in FIG. 7. It also shows a 2-stage release of the device. First going from point p5 to point p6, dominated by the high spring-constant section of the compound spring and a subsequent snap-back from point p7 to p8 dominated by the low spring-constant section of the compound spring. The hot-switch voltage in this case is a bit higher compared to the hot-switch voltage in FIG. 5.

The 2-stage landing concept with the compound spring also has another advantage. When the MEMS device is being pulled-in, it initially accelerates until it hits the compound spring element. At this point it is being decelerated by the compound spring element and a second pull-in behavior occurs. Since this secondary pull-in occurs over a much reduced distance, the velocity that the MEMS element develops is much reduced compared to an equivalent device with a linear spring. This reduced impact velocity leads to less wear and longer lifetimes.

There are several advantages to the embodiments disclosed herein. In particular, the embodiments minimize the switch size to achieve a fixed hot switch voltage and minimizes the landing voltage and landing velocity which improves the device reliability.

Figure 2B:
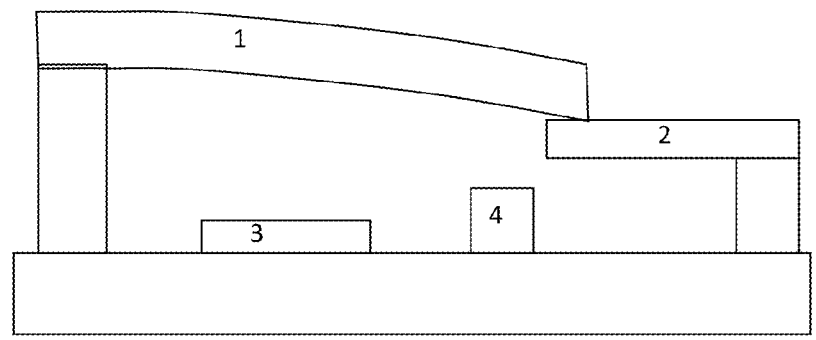
Figure 2C:
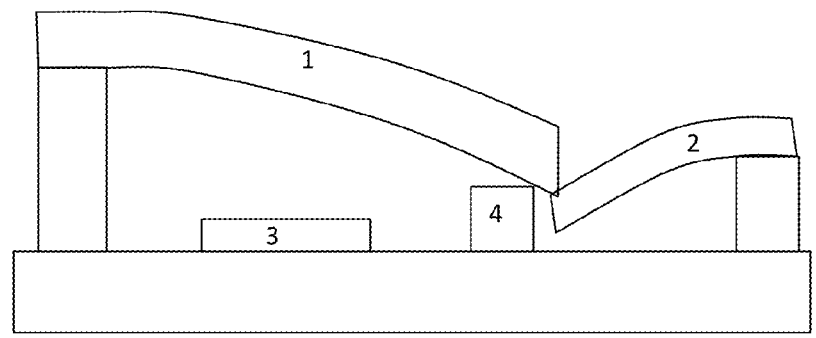
Figure 2D:
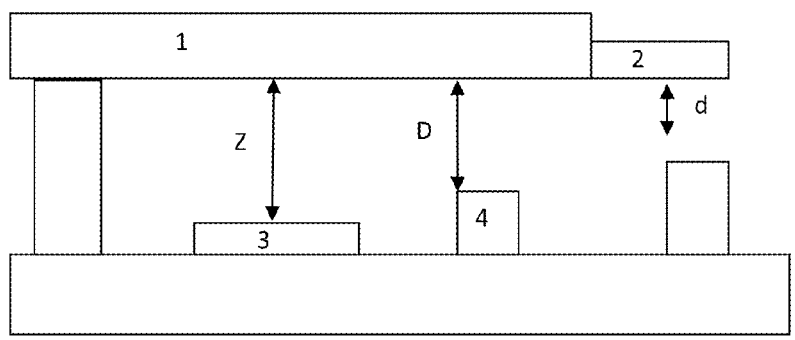
FIGS. 2D and 2E are schematic representations of a MEMS device according to another embodiment.
Figure 2E:
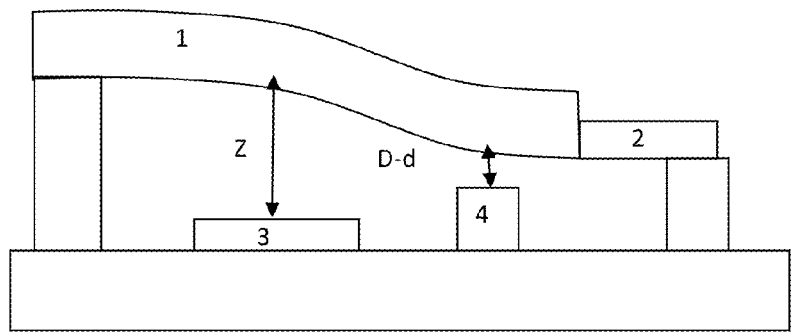
Figure 8A:
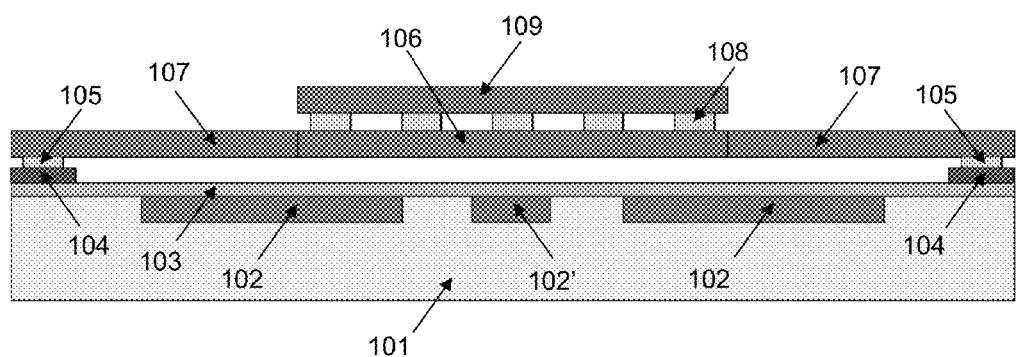
FIGS. 8A and 8B are schematic side views of a MEMS RF device according to one embodiment.
Figure 8B:
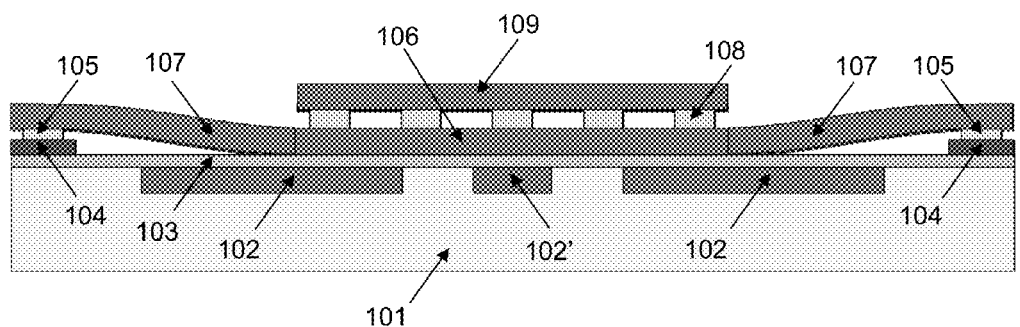
Figure 9:
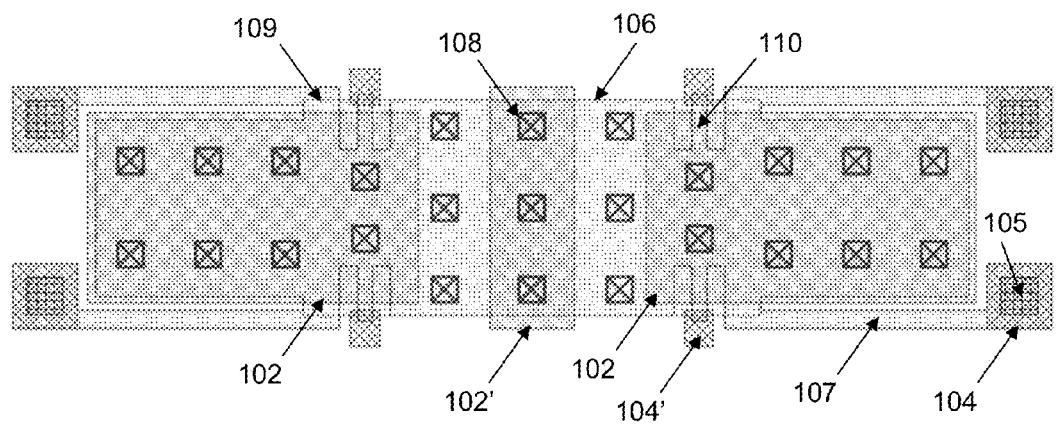
FIG. 9 is a schematic top view of the MEMS RF device of FIGS. 8A and 8B.

Now with reference to FIGS. 8A, 8B, 9 and 10, one embodiment is described that corresponds to the schematic view of FIGS. 2D-2E. It shows a MEMS RF switch fabricated on substrate 101. It contains pull-in (control) electrodes 102 and RF electrode 102'. Both layer 102 and 102' are formed at the same time by standard CMOS fabrication techniques (material deposition, lithographic masking steps and etches). Suitable materials that may be utilized for the electrodes 102, 102' include titanium, tantalum, titanium nitride, tantalum nitride, copper, aluminum, and combinations thereof. On top of substrate 101 and electrodes 102, 102' an insulating layer 103 is deposited, which serves to prevent leakage currents between the electrodes 102, 102' and the moveable MEMS element 106-109 once it is actuated in a landed position as shown in FIG. 8B. Suitable material that may be utilized for the insulating layer 103 include silicon oxide, silicon nitride, silicon oxynitride, spin-on glass, and combinations thereof.

On top of dielectric layer 103 a contact layer is deposited and patterned to form structures 104, 104'. Structures 104 serve as the landing points of the device anchor 105 and are optional. If structures 104 are not used device anchor 105 will anchor the MEMS element onto the insulating layer 103. Structures 104' (See FIG. 9) serve as the landing points of the composite springs 110.

If the contact layer 104, 104' is to be used to provide electrical connection to the substrate 101, suitable material that may be used for the contact layer 104, 104' include electrically conductive material such as a metal that may comprise a material selected from the group consisting of titanium, tantalum, titanium nitride, tantalum nitride, copper, aluminum, titanium-aluminum, aluminum-nitride, titanium-aluminum-nitride and combinations thereof. Alternatively, the contact layer 104, 104' may comprise an insulating layer including silicon oxide, silicon nitride, silicon oxynitride, spin-on glass, and combinations thereof.

A moveable MEMS element may be formed over the substrate 101 by depositing a sacrificial layer, patterning the sacrificial layer to expose the landing structure 104. It is to be understood that should the structure 104 not be utilized, the insulating layer 103 would be exposed. After the MEMS element is formed, another sacrificial layer may be deposited and patterned such that collectively, the sacrificial layers form the shape of the cavity within which the MEMS element will move. The sacrificial layers will eventually be removed to free the MEMS element. The sacrificial layers may be deposited by conventional processed such as plasma enhanced chemical vapour deposition (PECVD), chemical vapour deposition (CVD), spin-on technologies, and physical vapour deposition (PVD) to name a few. Suitable materials for the sacrificial layers include silicon containing compounds such as silicon dioxide, spin-on glass, or spin-on dielectric containing a long chain molecule with a carbon backbone. Such a material would need to have a low silicon content, because the sacrificial etch to remove carbon based compounds often leaves residues if they contain silicon. The anchors 105 are formed by etching holes in the first sacrificial layer. The bottom layer 106, 107 will deposit inside the holes to form anchors 105.

The moveable MEMS element consists of a 2-layer structure. The bottom-layer is formed by 106, 107 and the top-layer is formed by 109. Structure 106 and 107 are both part of the bottom structure but denoted with a separate index only to indicate the different function that these structures take. The bottom layer 106, 107 and top layer 109 are connected by support structures 108 in selected regions. In one embodiment these support structures 108 are formed by selectively etching holes in a sacrificial layer present on top of bottom layer 106, 107. The sacrificial layer will eventually be removed when the other sacrificial layers are removed. During deposition of the top layer 109, this layer will also deposit inside holes and land on the bottom layer 106, thereby forming the 2-layer MEMS structures with support structures 108. This method of forming the moveable MEMS element allows for the formation of a stiff membrane 106, 109 while still allowing for flexible support beams 107. The support beams 107 are anchored to the substrate 101 or contact layer 104 with support structures 105.

The material for bottom layer 106, 107, support structures 108, and top layer 109 include electrically conductive materials such as titanium, tantalum, titanium nitride, tantalum nitride, copper, aluminum, titanium aluminum, titanium aluminum nitride, and combinations thereof. While each of bottom layer 106, 107, and top layer 109 are shown as single layers, it is contemplated that each layer 106, 107, 109 may comprise a multi-layer structure. For example, a 5-layer stack (TiN—Al—TiN—Al—TiN) may be utilized for each layer 106, 107, 109. A 3-layer stack is also contemplated for each layer 106, 107, 109 such as TiN then Al then TiN. The tri-layer structure combines the strength advantages of TiN which has a high resistivity with the low resistance properties of Al which has poor mechanical strength. By sandwiching a thin Al layer between two TiN layers any residual stress difference in the deposition of the two materials will not cause differential stress in the MEMS structure. An additional advantage of a 3-layer structure is that the mechanical strength of TiN films is reduced at greater thickness of film. This is because of increased voids at increasing deposition thicknesses. By stopping the deposition of the TiN at around 200 nm putting down a thin Al layer and commencing growth, this problem can be greatly reduced. Layers 106, 107, 109 may be deposited by well known techniques such as sputtering, electroless plating and electrochemical plating. Layers 106, 107 and 109 may be patterned to form the desired final structure.

Figure 10:
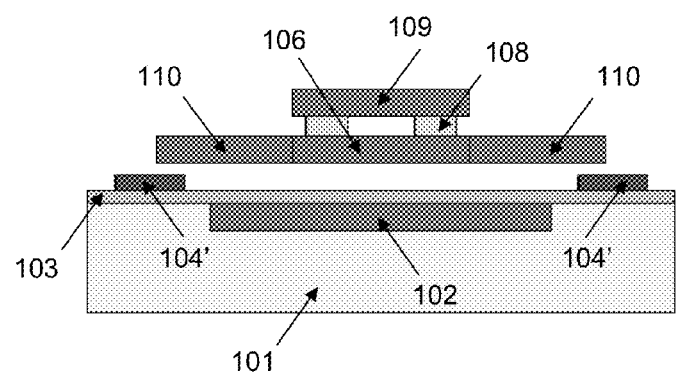
FIG. 10 is a schematic side view of the MEMS RF device of FIGS. 8A and 8B.

In the same bottom layer that forms structure 106 of the stiff membrane and the support beams 107, also the compound spring elements 110 are formed. Thus, when layers 106, 107 formed by patterning the electrically conductive material, compound spring elements 110 are also formed. FIG. 10 shows a cross-section view through the compound spring element 110 of FIG. 9. Landing structure 104' is positioned underneath the tip of the compound spring element 110 in such a way that if the MEMS element 106-109 is pulled down, the compound spring element 110 contacts the landing structure 104' before the membrane section 106 touches the insulating layer 103 over the RF electrodes 102' and pull-in electrodes 102. A further pull-in of the device will occur until the membrane 106 touches the insulating layer 103, which will result in the compound spring elements 110 to deflect and create an extra restoring force acting on the membrane.

The total restoring force acting on the membrane contains two components, the first component being the restoring force of the support beams 107 and the second component being the restoring force of the compound spring elements 110. The restoring force of the support beams 107 can be tuned by the dimensional parameters (i.e., length, width, thickness) and are chosen such that the pull-in voltage has the desired level. The restoring force component of the compound spring element 110 can be tuned by the dimensional parameters as well (i.e., length, width, thickness) as well as by the thickness of the landing structure 104'. The values are chosen such that the hot-switch voltage meets the desired level.

In order to obtain a high hot-switch voltage, it is important that the restoring forces created by these 2 components are effective over the area of the RF electrode 102'. For this reason, a stiff membrane (i.e., items 106, 108, 109) is required for obtaining a high hot-switch voltage. If, for instance, the MEMS structure would only contain the bottom layer 106, then the situation may arise where the restoring forces generated by the compound spring elements 110 would not help in releasing the membrane section 106 from the insulating layer 103 when the control voltage applied to the pull-in electrodes 102 is removed because the membrane could just deflect locally and stay in contact with the insulating layer 103 above the RF electrode in the presence of a high RF signal. In this case, to obtain a high hot-switch voltage a much stiffer bottom layer 106 would be required which would increase the pull-in voltage considerably as well.

The combination of the stiff 2-layer membrane structure 106, 109 with support structures 108 in combination with the support beams 107 (which deflect to move the membrane) and the compound spring elements 110 provide for a non-linear force-vs.-displacement curve as shown in FIG. 3 that is effective over the RF-area and provides for a high hot-switch voltage while keeping the pull-in voltage to an acceptable lower value. The restoring forces are most effective if the compound spring elements 110 are placed at a position close to the RF electrode 102'. The farther away from the RF electrode these are placed (i.e., closer towards the end of the plate), the stiffer the 2-layer membrane structure has to be for the same hot-switch voltage to be maintained.

It is to be understood that the MEMS elements described herein are enclosed within a cavity when complete. One or more encapsulating layers are formed over the topmost sacrificial layer before the MEMS element is released. One or more holes are formed through the encapsulating layer to permit the sacrificial layers to be exposed to an etchant and removed to free the MEMS element.

Figure 11:
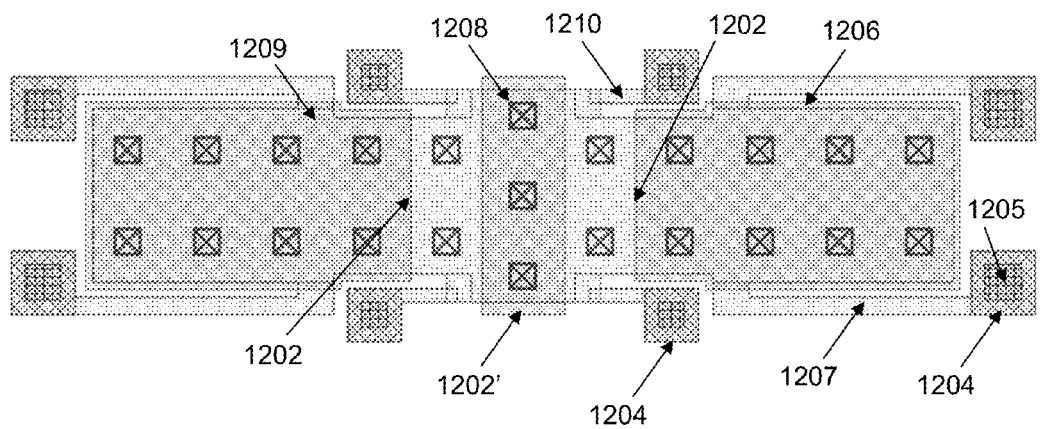
FIG. 11 is a schematic top view of a MEMS RF device according to another embodiment.
Figure 12:
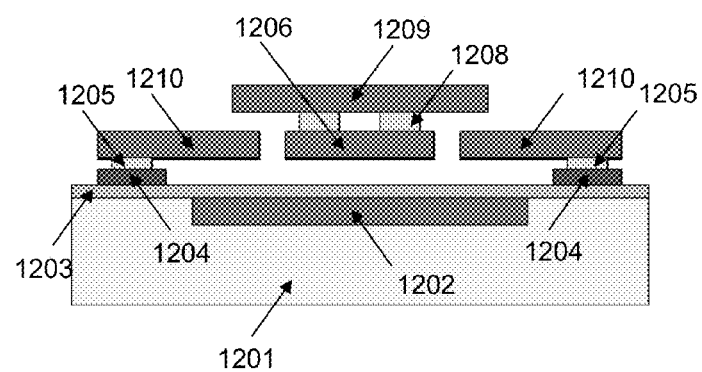
FIG. 12 is a schematic side view of the MEMS RF device of FIG. 11.

Now with reference to FIGS. 11 and 12, another embodiment is described that corresponds to the schematic view of FIGS. 2A-2C. The materials and fabrication processes utilized to fabricate the device include the materials and processes as described above with regard to FIGS. 8A, 8B, 9 and 10. However, in order to form the different structure, the patterning shape of the sacrificial layers and the structural layers that form the MEMS device are adjusted accordingly. FIG. 12 shows a cross-section view through the compound spring elements 1210. The top-layer 1209 is connected to the bottom layer 1206 by support structures 1208. In this case the compound spring elements 1210 are anchored to the substrate 1201 via support structures 1205 and optionally contact layer 1204. The top-layer 1209 of the membrane is shaped such that it overlaps the tip of the compound spring elements 1210 in such a way that if the MEMS element is pulled in, the top-layer 1209 contacts the compound spring element 1210 before the membrane section 1206 contacts the insulating layer 1203 over the RF electrodes 1202' and pull-in electrodes 1202. This is achieved by ensuring that the sacrificial layer that is deposited between bottom layer 1206, 1207, 1210 and top layer 1209 is thinner than the sacrificial layer that is deposited between bottom layer 1206, 1207, 1210 and insulating layer 1203.

A further pull-in of the device will occur until the membrane 1206 touches the insulating layer 1203, which will result in the compound spring elements 1210 to deflect and create an extra restoring force acting on the membrane.

The total restoring force acting on the membrane contains two components, the first component being the restoring force of the support beams 1207 and the second component being the restoring force of the compound spring elements 1210. The restoring force of the support beams can be tuned by the dimensional parameters (i.e., length, width, thickness) and are chosen such that the pull-in voltage has the desired level. The restoring force component of the compound spring element 1210 can be tuned by the dimensional parameters (i.e., length, width, thickness) as well as by the difference in thickness of the sacrificial layer below and above the bottom layer 1206. The values are chosen such that the hot-switch voltage meets the desired level.

Figure 13:
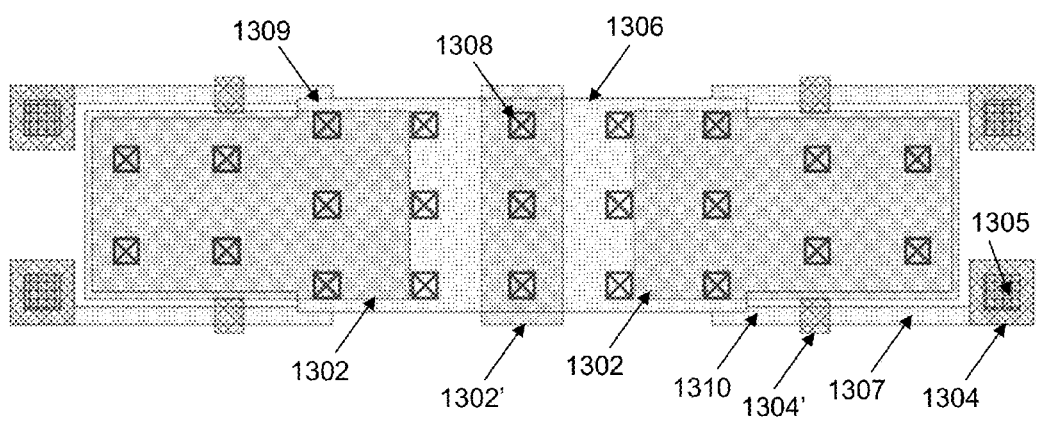
FIG. 13 is a schematic top view of a MEMS RF device according to another embodiment.
Figure 14:
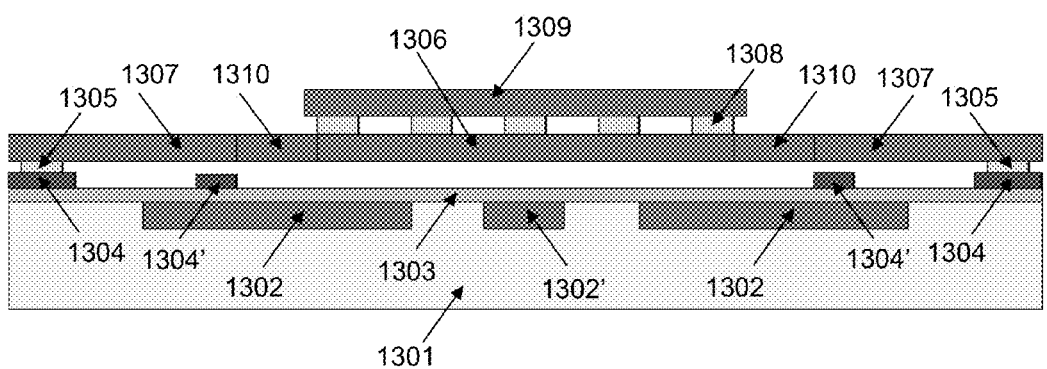
FIG. 14 is a schematic side view of the MEMS RF device of FIG. 13.

Now with reference to FIGS. 13 and 14, another embodiment is described. The materials and fabrication processes utilized to fabricate the device include the materials and processes as described above with regard to FIGS. 8A, 8B, 9 and 10. However, in order to form the different structure, the patterning shape of the sacrificial layers and the structural layers that form the MEMS device are adjusted accordingly. The device includes a substrate 1301, electrodes 1302, 1302', insulating layer 1303, contacts 1304, 1304', top layer 1309 and support structures 1308. In this case the compound spring element 1310 is combined with the support beams 1307. This is achieved by including the contact layer 1304' underneath the support beam 1307 somewhere along the length between the anchor point 1305 and the attachment of the support beam 1307 to the membrane 1306.

The initial stiffness of the support beam 1307 is given by its total length, width and thickness which are targeted to result in the desired pull-in voltage. Once the device is pulled in and the support beam 1307 touches the contact structure 1304', the stiffness of the leg increases, resulting in the non-linear force-vs.-distance curve of FIG. 3. The extra stiffness created by the contact structure 1304' is given by the position of the contact structure underneath the support beam 1307 and by the thickness of the contact layer 1304'. A higher stiffness is achieved by locating the contact structure 1304' closer to the attachment point of the support beam 1307 to the plate 1306. The position of contact structure 1304' is chosen such to result in the desired hot-switch voltage.

Figure 15:
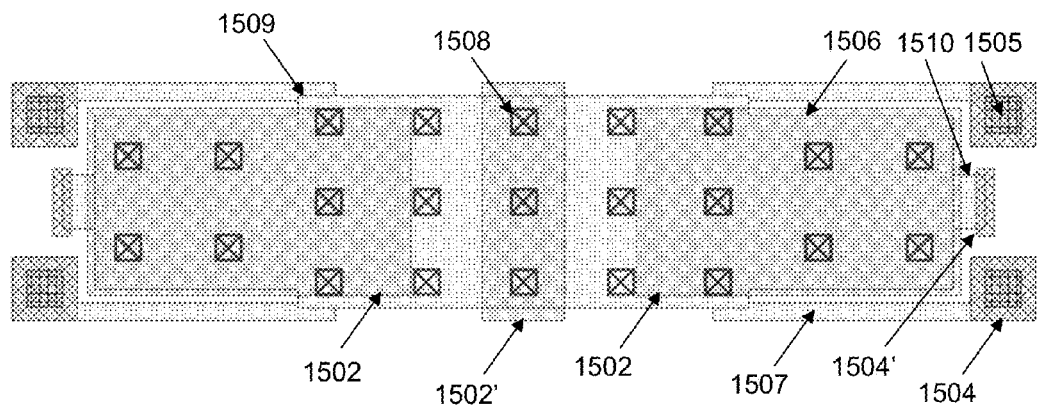
FIG. 15 is a schematic top view of a MEMS RF device according to another embodiment.
Figure 16:
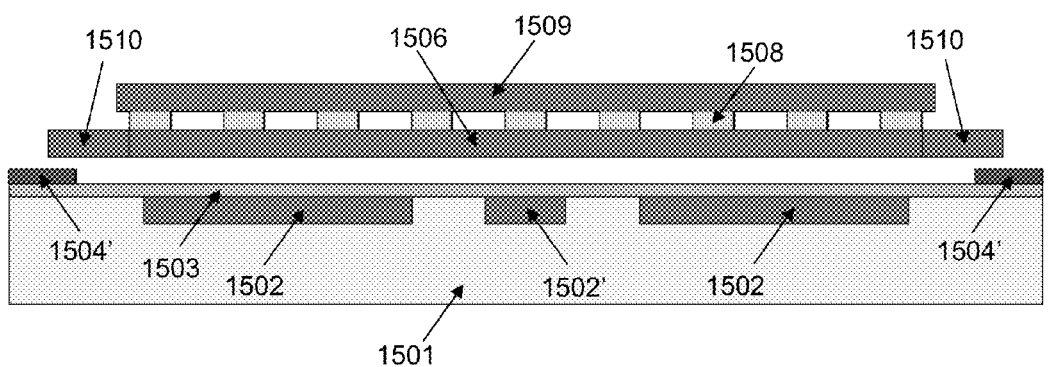
FIG. 16 is a schematic side view of the MEMS RF device of FIG. 15.

Now with reference to FIGS. 15 and 16, another embodiment is described that includes a substrate 1501, anchor points 1505, and contacts 1504. The materials and fabrication processes utilized to fabricate the device include the materials and processes as described above with regard to FIGS. 8A, 8B, 9 and 10. However, in order to form the different structure, the patterning shape of the sacrificial layers and the structural layers that form the MEMS device are adjusted accordingly. In this case the compound spring element 1510 is created at the back-end of the plate 1506. Landing structure 1504' is positioned underneath the tip of the compound spring element 1510 in such a way that if the MEMS element 1506-1509 is pulled down, the compound spring element 1510 contacts the landing structure 1504' before the membrane section 1506 touches the insulating layer 1503 over the RF electrodes 1502' and pull-in electrodes 1502.

The actual compound spring element that creates the extra restoring force in this case entails both the short stub 1510 at the plate-end as well as the complete stiff plate 1506, 1508, 1509. Upon a further pull-in of the device both the section 1510 and the complete plate 1506, 1508, 1509 will deflect, until the membrane 1506 touches the insulating layer. The plate-bending deflection of the stiff plate and the stub 1510 will create an extra restoring force acting on the membrane to create the non-linear force-vs.-displacement curve as shown in FIG. 3, which will help it to pull-off once the pull-in voltage is removed from pull-in electrode 1502 in the presence of an RF voltage on the RF electrode 1502'.

Figure 17:
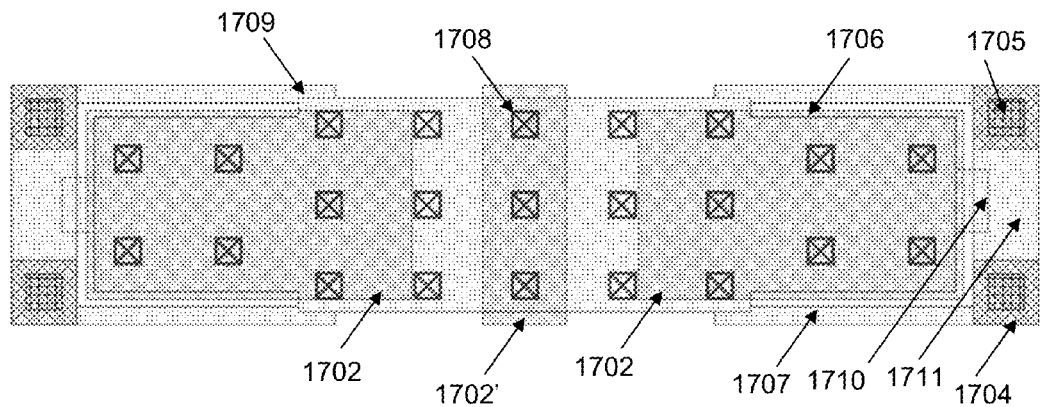
FIG. 17 is a schematic top view of a MEMS RF device according to another embodiment.
Figure 18:
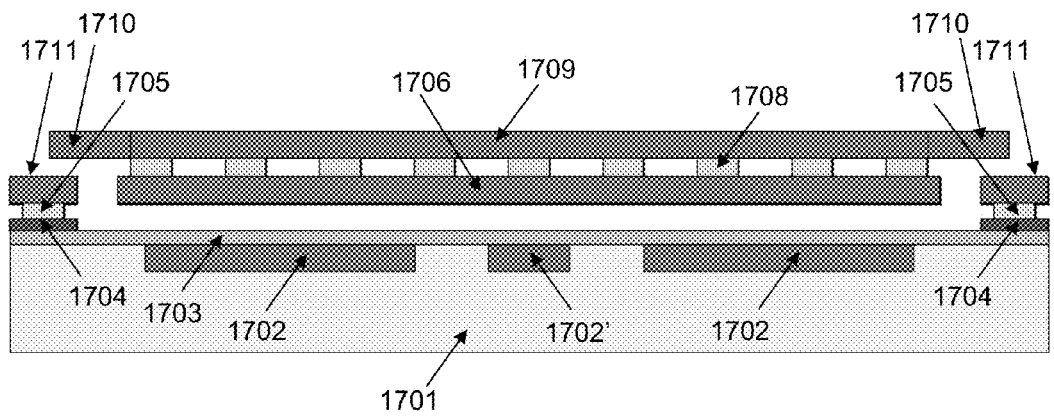
FIG. 18 is a schematic side view of the MEMS RF device of FIG. 17.

Plate-bending contributes a larger percentage to the total restoring force in this embodiment compared to the embodiments of FIGS. 9-14. The restoring force can be tuned by the thickness of the bottom layer 1506, 1507, 1510, the thickness of the top layer 1509 and the thickness of the support structures 1508 (i.e., the separation between layers 1506 and 1509). The percentage of the total restoring force due to the plate-bending vs. the percentage of the total restoring force coming from the deflection of the short stub 1510 at the plate end depends on the dimensions of the plate and the stub, Now with reference to FIGS. 17 and 18, another embodiment is described that includes a substrate 1701, anchor points 1705, and contacts 1704. The materials and fabrication processes utilized to fabricate the device include the materials and processes as described above with regard to FIGS. 8A, 8B, 9 and 10. However, in order to form the different structure, the patterning shape of the sacrificial layers and the structural layers that form the MEMS device are adjusted accordingly. In this case the compound spring element 1710 is created at the back-end of the plate 1709. Landing structure 1711 which is created in the same layer as the bottom layer 1706 is positioned underneath the tip of the compound spring element 1710 in such a way that if the MEMS element 1706-1709 is pulled down, the compound spring element 1710 contacts the landing structure 1711 before the membrane section 1706 touches the insulating layer 1703 over the RF electrodes 1702' and pull-in electrodes 1702. This is achieved by ensuring that the sacrificial layer that is deposited between bottom layer 1706, 1707 and top layer 1709, 1710 is thinner than the sacrificial layer that is deposited between bottom layer 1706, 1707 and insulating layer 1703.

The actual compound spring element that creates the extra restoring force in this case entails both the short stub 1710 at the plate-end as well as the complete stiff plate 1706, 1708, 1709 and the stiffness of the landing structure 1711. Upon a further pull-in of the device both the section 1710 and the complete plate 1706, 1708, 1709 as well as the landing structure 1711 will deflect, until the membrane 1706 touches the insulating layer. The plate-bending deflection of the stiff plate and the stub 1710 will create an extra restoring force acting on the membrane to create the non-linear force-vs.-displacement curve as shown in FIG. 3, which will help it to pull-off once the pull-in voltage is removed from pull-in electrode 1702 in the presence of an RF voltage on the RF electrode 1702'.

Plate-bending contributes a larger percentage to the total restoring force in this embodiment compared to the embodiments of FIGS. 9-14. The restoring force can be tuned by the thickness of the bottom layer 1706, 1707, 1711, the thickness of the top layer 1709, 1710 and the thickness of the support structures 1708 (i.e., the separation between layers 1706 and 1709). The percentage of the total restoring force due to the plate-bending vs. the percentage of the total restoring force coming from the deflection of the short stub 1710 at the plate end depends on the dimensions of the plate and the stub.

The landing structure 1711 in this embodiment can be made stiff by placing a device anchor 1705 very close by or more compliant by placing a device anchor 1705 further away. In case of a more compliant landing structure, it reduces the effectiveness of the compound spring, but it also reduces the impact force of the stub 1710 with the landing structure which can improve the lifetime of the device.

Figure 19:
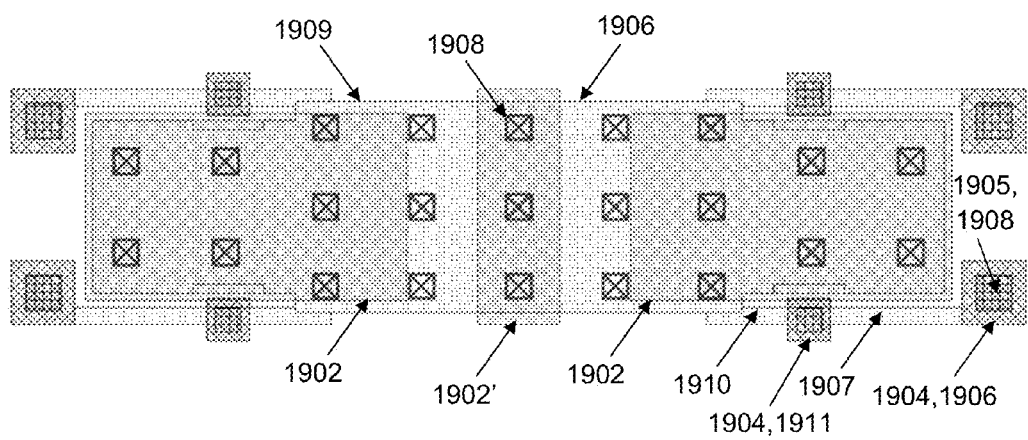
FIG. 19 is a schematic top view of a MEMS RF device according to another embodiment.
Figure 20:
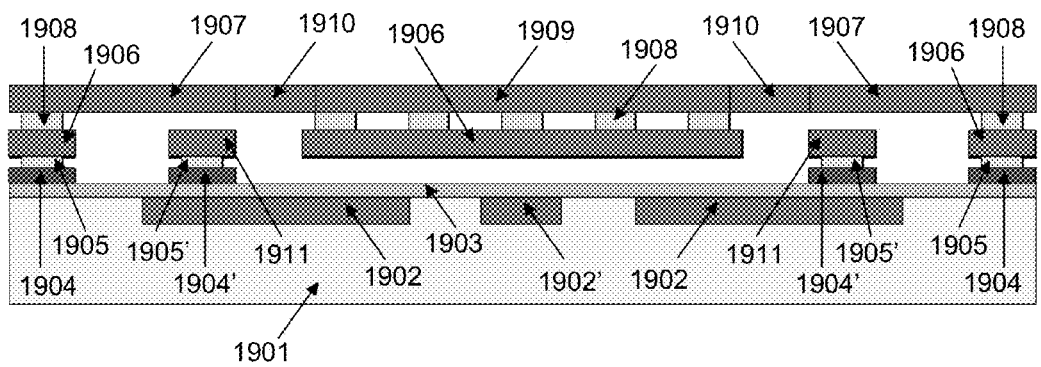
FIG. 20 is a schematic side view of the MEMS RF device of FIG. 19.

Now with reference to FIGS. 19 and 20, another embodiment is described. The materials and fabrication processes utilized to fabricate the device include the materials and processes as described above with regard to FIGS. 8A, 8B, 9 and 10. However, in order to form the different structure, the patterning shape of the sacrificial layers and the structural layers that form the MEMS device are adjusted accordingly. The device includes a substrate 1901, electrodes 1902, 1902', insulating layer 1903, contacts 1904, 1904', anchors 1905, 1905', bottom layer 1906, 1906', top layer 1907, 1909, 1910 and support structures 1908. In this case the compound spring element 1910 is combined with the support beams 1907 which are now located in the top-layer. This is achieved by including the contact layer 1904' underneath the support beam 1907 somewhere along the length between the anchor point 1905 and the attachment of the support beam 1907 to the membrane 1909. Landing structure 1911 which is created in the same layer as the bottom layer 1906 is positioned above the contact layer 1904' and anchored to it via support structure 1905'.

The initial stiffness of the support beam 1907 is given by its total length, width and thickness which are targeted to result in the desired pull-in voltage. Once the device is pulled in and the support beam 1907 touches the landing structure 1911, the stiffness of the leg increases, resulting in the non-linear force-vs.-distance curve of FIG. 3. The extra stiffness created by the landing structure 1911 is given by the position of the landing structure 1911 underneath the support beam 1907 and by the difference in thickness of the sacrificial layer below and above the bottom layer 1906. A higher stiffness is achieved by locating the landing structure 1911 closer to the attachment point of the support beam 1907 to the plate 1909. The position of landing structure 1911 is chosen such to result in the desired hot-switch voltage.

The described embodiments above can also be combined to use various compound spring elements 110, 1210, 1310, 1910 placed close by the RF electrode 102', 1202' (FIGS. 9-12) as well as placed underneath the support beams 1307, 1907 (FIGS. 13-14, 19-20) or utilize the plate-bending embodiments (FIGS. 15-18). In described embodiments of FIGS. 9-10 and FIGS. 13-16 the compound spring engagement depends on the thickness of the contact structure 104', 1304', 1504'. In described embodiments of FIGS. 11-12 and FIGS. 17-20 the compound spring engagement depends on the difference in thickness of the sacrificial layer below and above the bottom layer 1206, 1706, 1906. By combining compound spring elements that depend on different dependencies it is possible to create a multi-stage compound system where first one set of compound springs is activated and then the next set. Such a multi-stage compound system may further reduce the impact velocity of the moveable MEMS structure 106-109, 1206-1209, 1306-1309, 1506-1509, 1706-1709, 1906-1909 and increase the hot-switch voltage more.

While the foregoing is directed to embodiments of the present invention, other and further embodiments of the invention may be devised without departing from the basic scope thereof, and the scope thereof is determined by the claims that follow.

The invention claimed is:

1. A device, comprising: a substrate having one or more electrodes formed therein; an electrically insulating layer disposed over the substrate and the one or more electrodes; one or more landing structures coupled to the substrate; a MEMS element coupled to the substrate, the MEMS element movable from a first position to a second position spaced from the electrically insulating layer, the MEMS element including a first portion that contacts the electrically insulating layer when the MEMS element is in the first position and a second portion that contacts the one or more landing structures when the MEMS element is in the second position, wherein the first portion includes a waffle structure comprising a bottom layer and a top layer coupled to the bottom layer via one or more support structures, wherein the second portion consists of the bottom layer.

2. The device of claim 1, wherein the bottom layer comprises titanium aluminum nitride.

3. The device of claim 1, wherein the second portion is coupled between the first portion and a third portion that is coupled to the substrate when the MEMS element is in both the first position and the second position.

4. A device, comprising: a substrate having one or more electrodes formed therein; an electrically insulating layer disposed over the substrate and the one or more electrodes; one or more landing structures coupled to the substrate; a MEMS element coupled to the substrate, the MEMS element movable from a first position to a second position spaced from the electrically insulating layer, the MEMS element including a first portion that contacts the electrically insulating layer when the MEMS element is in the first position and a second portion that contacts the one or more landing structures when the MEMS element is in the second position, wherein the first portion includes a waffle structure comprising a bottom layer and a top layer coupled to the bottom layer via one or more support structures, wherein the second portion consists of the top layer.

5. The device of claim 4, wherein the second portion is coupled between the first portion and a third portion that is coupled to the substrate when the MEMS element is in both the first position and the second position.

6. The device of claim 4, wherein the bottom layer comprises titanium aluminum nitride.

7. The device of claim 4, wherein at least one electrode of the one or more electrodes is an RF electrode.

* * * * *